Patented Jan. 27, 1942

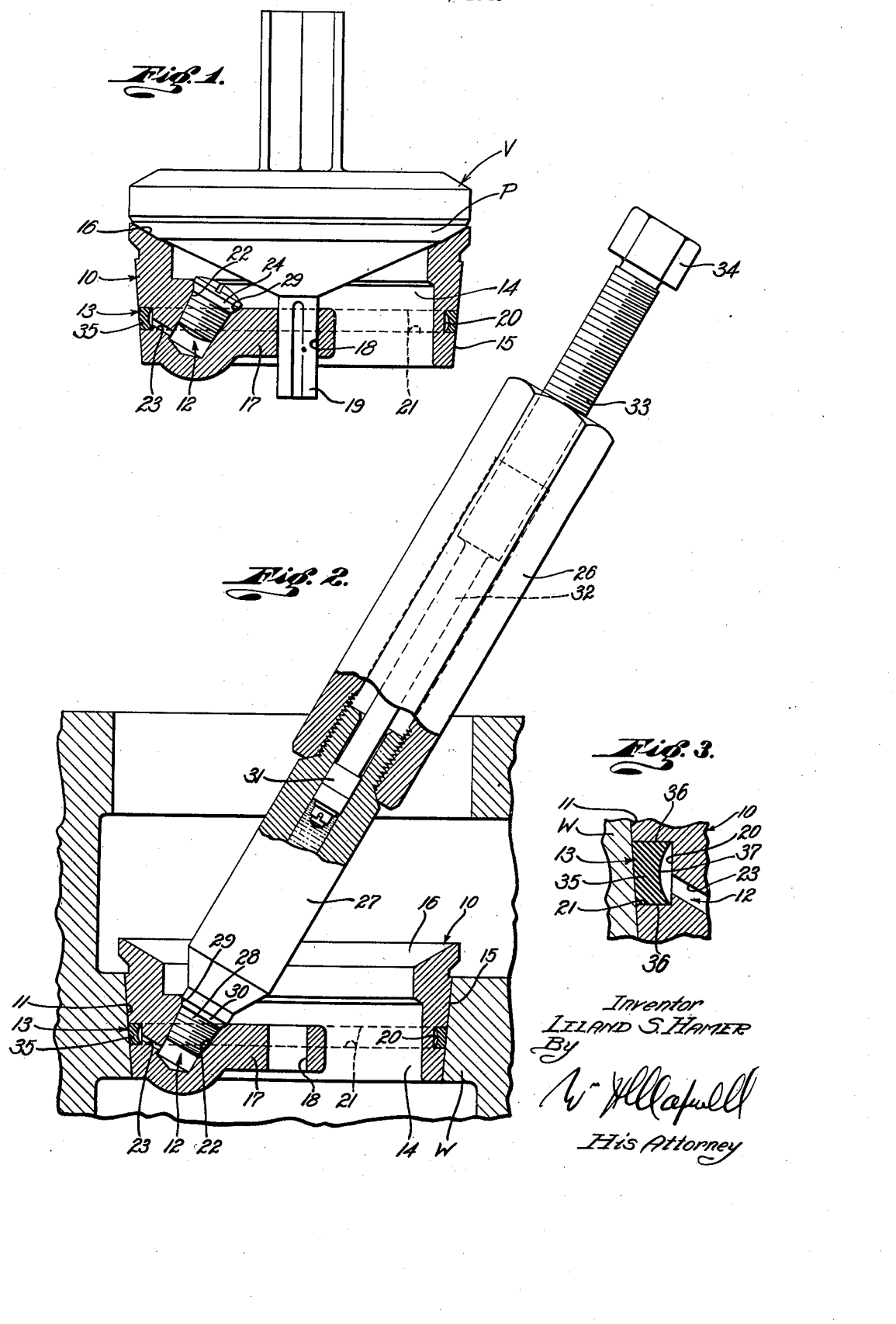

2,271,137

UNITED STATES PATENT OFFICE 2,271,137

VALVE SEAT

Leland S. Hamer, Long Beach, Calif., assignor of one-third to Paul A. Dewhirst, Los Angeles, and one-sixth to Vernon Zillgitt, Long Beach, Calif.

Application February 19, 1940, Serial No. 319,701

8 Claims. (Cl. 251—167)

This invention relates to valve seats of the class employed in pumps, etc., where poppet valves are used, and it is a general object of the invention to provide valve seats of this character that may be easily and quickly removed for repair and replacement.

Another object of this invention is to provide improvements in valve seats of the character disclosed in Patent No. 2,081,431, issued to me May 25, 1937.

Where poppet valves are employed in reciprocating piston pumps and like mechanisms it is the practice to install replaceable valve seats. The valve seats are tapered and entered in correspondingly shaped openings in the valve chests. In many cases the hammering action of the closing valves drives the seats so tightly into the tapered openings that much difficulty is experienced in removing the seats for replacement. In some instances the seats become so tightly lodged in the tapered openings that it is necessary to break them out or to burn them out with acetylene torches, endangering the valve chests, etc. My prior patent discloses a valve seat designed to overcome these difficulties. The exterior of the valve seat disclosed in the said patent has an annular groove and means is provided whereby fluid under a high pressure may be introduced into the groove to lift or loosen the seat for easy removal by a high pressure lubricating action. This patented construction operates very successfully in most cases. However, the valve seat, the seat receiving opening, or both, are sometimes out of round, pitted, or scored, and the fluid under pressure, delivered to the groove to free the seat, leaks away so that it is impossible to provide sufficient pressure in the groove to free the seat.

An important object of this invention is to provide a valve seat embodying novel means operable to expand the material of the pump frame or valve chest around the seat thereby causing said material to move away from the seat allowing the seat to suddenly move out of the opening.

Another object of this invention is to provide a valve seat of the class disclosed in my prior patent above referred to, in which the seat loosening or freeing means is fully effective, even though the seat, the seat receiving opening, or both, are out of round, pitted, scored, or otherwise defective, to permit the escape of fluid under pressure introduced between the surfaces of the seat and the wall of the opening.

Another object of this invention is to provide a valve seat of the character mentioned in which a space is provided between the wall of the opening and the periphery of the valve seat to receive the fluid under extremely high pressure for freeing the seat, and novel sealing means is provided to prevent the escape or leakage of the fluid under pressure from the space, even though the seat, the opening, or both, are out of round, rough surfaced, pitted, or the like.

Another object of this invention is to provide a valve seat of the character mentioned in which the sealing means serves to prevent the leakage of the fluid around the seat during operation of the pump.

A further object of this invention is to provide a readily removable valve seat of the character above referred to that is simple and inexpensive, costing but little more than conventional valve seats.

The various objects and features of my invention will be fully understood from the following detailed description of a typical preferred form and application of the invention, throughout which description reference is made to the accompanying drawing, in which:

Fig. 1 is a vertical detailed sectional view of the improved valve seat of this invention showing a valve engaging thereon, the valve being in side elevation. Fig. 2 is a fragmentary sectional view of a portion of a typical pump with the valve seat of the invention installed therein, showing a means for supplying fluid under pressure to the seat to free the same, and Fig. 3 is an enlarged, fragmentary vertical detailed sectional view showing the fluid pressure space and the sealing means.

The valve seat of the present invention may be said to comprise, generally, a seat body 10 for arrangement in an opening 11 in the wall W of a valve chest, means 12 at the periphery of the body 10 for receiving fluid under pressure for freeing the body and sealing means 13 for preventing the loss of the fluid under pressure from the means 12.

The valve seat body 10 is a tubular or annular member having a central longitudinal opening 14 for passing the fluid handled by the pump. The exterior of the seat body 10 is shaped to conform to the opening 11 in the valve chest wall W. In accordance with the usual practice the opening 11 has a downwardly and inwardly tapered wall and the periphery 15 of the body 10 is correspondingly tapered and is finished to accurately and tightly fit the opening 11. The seat body 10 may project from the upper surface of the wall 11 and its upper end is provided with a suitable sealing surface 16. The sealing part or surface 16 of the body 10 may be varied as desired without departing from the invention. In the case illustrated the sealing surface 16 is annular and slopes downwardly and inwardly to be engaged by the sealing part P of the valve V. The tubular or annular seat body 10 has a web 17 projecting transversely into or through its opening 14. The web 17 is preferably integral with the seat body 10 and has a central vertical opening 18 for slidably receiving the guide stem 19 of the valve part.

The means 12 is provided to receive fluid under high pressure and to utilize this fluid pressure to expand the wall W around the opening 11 and thus free the seat body 10 from the tapered opening. The means 12 includes or provides a confined fluid receiving space or chamber between the external surface of the body 10 and the wall of the opening 11. In the preferred construction an annular groove 20 is provided in the periphery 15 of the body 10 for the reception of the fluid under pressure. The groove 20 is spaced between the upper and lower ends of the body 10 and is preferably continuous and uniform in cross sectional shape and area. The upper and lower walls 21 of the groove 20 may be flat and parallel.

The means 12 further includes a port system for conducting or delivering fluid under pressure to the groove 20. This port system includes a threaded socket 22 in the body web 17 and a lateral port 23 extending from the inner part of the socket 22 to the groove 20. The socket 22 faces upwardly and in the preferred construction is pitched to face upwardly and inwardly toward the longitudinal axis of the valve and seat assembly. The lower end of the socket 22 is closed except for the port 23 which extends outwardly to the groove 20. The port 23 preferably joins the groove 20 at its back or inner wall. During operation of the pump or mechanism in which the seat is installed the socket 22 is closed. A suitable plug 24 is threaded in the mouth of the socket 22. The plug 24 serves to prevent solid material and other foreign material from entering the socket 22 and the port 23. The socket 22, the port 23, and the groove 20 may be packed with lubricant.

Any suitable or selected type of fluid pressure containing or generating means may be employed to supply fluid under pressure to the means 12. In Fig. 2 of the drawings I have illustrated one form of fluid pressure developing means comprising a tubular body member 26 provided at its lower end with a cylinder member 27. A reduced pin fitting 28 is secured to the lower end of the member 27 and is adapted to be threaded into the socket 22. The mouth of the socket 22 is formed with a tapered seat 29 and upon removal of the plug 24 the fitting 28 may be threaded into the socket to bring a tapered sealing face 30 against the surface 29. A plunger 31 operates in the cylinder member 27 and is carried by a stem 32. The stem 32 carries a thread 33 mating with a thread in the body 26 and a head 34 is formed on the outer end of the stem 32 to facilitate turning of the stem. The cylinder member 27 and its fitting 28 may contain a suitable fluid such as grease and advancement of the stem 32 by threading of the same forces the plunger 31 through the cylinder member 27 so that the fluid is ejected under pressure from the fitting 28. This fluid is delivered to the means 12.

The sealing means 13 serves to prevent the leakage of fluid under pressure from the groove 20 and is important as it assures the easy release of the seat body 10 by the action of the fluid pressure in situations where the seat body, the opening 11, or both, are out of round or otherwise malformed, injured, or worn, so that the fluid pressure readily frees the seat body. The sealing means 13 comprises a ring 35 for sealing with the wall of the opening 11 at the mouth of the groove 20. The ring 35 is preferably a continuous annular member of uniform cross section and shape. In the preferred construction the sealing ring 35 is resilient, being formed of rubber, synthetic rubber, or such material combined with fabric. The sealing ring 35 is proportioned to fit and effectively close the mouth of the groove 20. Flat end surfaces 36 are provided on the sealing ring 35 to cooperate with the walls 21 of the groove 20. The periphery of the sealing ring 35 is sloping or tapered to evenly bear against and seal with the wall of the opening 11. It is preferred to proportion the sealing ring 35 so that it seals with the wall of the opening 11 and the walls of the groove 20 through its own resiliency, to prevent the leakage of the pumped fluid around the seat body 10 during operation of the pump. In accordance with the invention an annular chamber or space is left in the groove 20 behind the ring 35 to receive the fluid under pressure from the port 23. The inner side of the sealing ring 35 is recessed or concaved to provide this fluid receiving space. In the preferred construction illustrated an annular groove 37 is formed in the inner side of the sealing ring 35. The groove 37 preferably has a concave wall so that the fluid pressure behind the sealing ring 35 serves to force the ring against the walls of the groove 21 as well as the wall of the opening 11. The width of the groove 20 and the sealing ring 35 may be increased to provide ample area behind the ring to assure the expansion of the wall W around the opening 11 by the fluid pressure.

The seat body 10 may be installed in the opening 11 in the usual manner and the valve V cooperates with the seat in the well known manner. Prior to installing the seat body 10 it may be preferred to supply lubricant to the socket 21 and the port 23 and to close the socket by the plug 24. During operation of the pump or mechanism the resilient sealing ring 35 bearing in the groove 20 and sealing with the wall of the opening 11 serves to prevent the leakage of fluid around the seat body 10. When it becomes desirable or necessary to remove the seat body 10 for reconditioning or replacement the valve V is removed and the plug 24 is unthreaded from the socket 22. The fitting 28 of the fluid pressure developing means is then threaded in the socket 22 and the stem 32 is threaded inwardly. The head 34 may be engaged by a wrench or the like to facilitate the threading of the stem 32.

Upon inward threading of the stem 32 the plunger 31 forces the fluid under pressure from the small cylinder of the member 27 and a high pressure is developed in the socket 22, the port 23 and the groove 20. In practice a very high pressure may be exerted on the fluid in the groove 20. This fluid under high pressure loosens or frees the seat body 10 for easy removal from the opening 11. In most instances the seat body 10 moves up out of the opening 11 or may be manually lifted from the opening 11 following the development of a high pressure in the groove 20. The fluid under pressure in the groove 20 operates to contract the seat body 10 and to expand the material defining the opening 11 thus freeing the seat body 10 for easy removal. The fluid under pressure behind the sealing ring 35 of course forces the sealing ring outwardly against the wall of the opening 11 and serves to force the ring against the walls 21 of the groove 20. Thus the sealing ring 35 is forced into tight sealing cooperation with the adjacent surfaces of the body 10 and the wall of the opening 11 to dependably prevent the escape of fluid under pressure from the groove 20. In the event the opening 11 is out of round or malformed, or in the event the exterior of the body 10 is out of round or malformed adjacent the groove 20, the sealing ring 35 conforms to the irregularities and mal-formations so that the fluid under high pressures in the groove 20 cannot escape. Thus the sealing ring 35 assures the loosening or freeing of the seat body 10 by the fluid pressure in the groove 20 in every case. The means 12 and the sealing means 13 are easily and inexpensively provided in the seat body 10 and are such that the valve seat may be employed in practically every situation with the assurance that it may be easily removed when necessary.

Having described only a typical preferred form and application of my invention, I do not wish to be limited or restricted to the specific details herein set forth, but wish to reserve to myself any varations or modifications that may appear to those skilled in the art, or fall within the scope of the following claims.

Having described my invention, I claim:

1. In a valve construction a stationary wall having a tapered bore opening and an annular valve seat tightly seated in the opening to be stationary with the wall, and means for expanding the wall to release the seat comprising surfaces defining a confined space between the wall and the seat, means for conducting fluid to said space under pressure substantially greater than that passed by the valve, and a sealing element carried in said space to confine the fluid under pressure between the wall and the valve seat whereby the fluid pressure expands the wall to free the seat.

2. In a valve construction a stationary wall having a tapered bore opening and an annular valve seat tightly held in the opening to be stationary with the wall, surfaces defining a confined space between the wall and the seat, means for conducting fluid to said space under pressure substantially greater than that passed by the valve, and a resilient sealing ring in said space normally engaging said surfaces preventing the leakage of fluid between the seat and the wall of the opening and operable to confine said fluid under pressure in said space whereby said fluid under pressure may expand the wall around the opening to release the seat from the opening.

3. In combination with a pump body wall having a tapered opening and a tapered valve seat fitting tightly in the opening to be stationary with the wall, a valve seat releasing means comprising surfaces on the seat and wall defining a confined annular space around the seat which is closed to the interior of the seat and the interior of the pump body, a yielding sealing ring in said space sealing with the seat and the wall to prevent the escape of fluid from said space, and means for conducting fluid other than that controlled by the valve under pressure to the space behind the sealing ring to expand the wall around the opening and release the seat.

4. In combination with a pump body wall having a tapered opening and a tapered valve seat fitting tightly in the opening to be stationary and rigid with the body wall, a valve seat releasing means comprising surfaces on the exterior of the seat and on the wall defining a confined annular space around the seat, a yielding sealing ring in said space sealing with the seat and the wall to prevent the escape of fluid from said space, the rear side of the side of the sealing ring having a groove with a concave wall, and means for conducting fluid other than that controlled by the valve under pressure to the space behind the sealing ring to expand the material around the opening and release the seat from the opening.

5. A valve seat for arrangement in a tapered opening in a stationary wall comprising a valve seat body having a tapered periphery for tightly fitting the opening to be stationary with the wall, the body having an external groove in its periphery, a web in the body having a port leading outwardly to the groove to conduct fluid pressure thereto, means for connecting the web with a fluid pressure generating device so fluid under high pressure may be supplied to the port, and a resilient sealing ring in the groove engaging the wall of the opening and serving to prevent the leakage of said fluid whereby the fluid pressure may expand the material around the opening and free the body for easy removal, said port forming the sole fluid entrance to the groove.

6. A valve seat for arrangement in a tapered opening in a stationary wall comprising a valve seat body having a tapered periphery for tightly fitting the opening to be stationary with the wall, the body having a groove in its external periphery, a web in the body having a port leading outwardly to the groove to conduct fluid pressure thereto, means at the outer end of the port for receiving a fluid pressure developing means, and a resilient sealing ring in the groove engaging the wall of the opening and serving to confine said fluid pressure in the groove whereby the fluid pressure may free the body for easy removal, said port forming the sole fluid entrance to the groove.

7. A valve seat for arrangement in a tapered opening in a stationary pump wall comprising a valve seat body having a tapered periphery for tightly fitting the opening to be stationary and rigid with the pump wall, the body having a groove in its periphery and a port for conducting fluid pressure to the groove, means at the outer end of the port for making tight connection with a high pressure generator, and a sealing element in the mouth of the groove for sealing with the wall of the opening and the walls of the groove confining said fluid under pressure to the groove whereby fluid under high pressure introduced through the port may expand the material around the opening and free the body.

8. A valve seat for arrangement in a tapered opening in a stationary wall comprising a valve seat body having a tapered periphery for tightly fitting the opening to be stationary with the wall, the body having an annular groove in its external periphery and a port for conducting fluid under pressure from a high pressure source to the groove, and a resilient sealing ring in the groove for sealing with the wall of the opening and the walls of the groove to confine said fluid under pressure in the groove whereby the pressure may expand the material around the opening and free the body.

LELAND S. HAMER.